United States Patent [19]

van Rooijen

[11] Patent Number: 5,089,279

[45] Date of Patent: Feb. 18, 1992

[54] METHOD OF MAKING A GRANULAR BEVERAGE MATERIAL BY MEANS OF SINTERING AND THEN GRANULATING

[75] Inventor: Adrianus van Rooijen, Hellevoetsluis, Netherlands

[73] Assignee: Conopco, Inc., N.J.

[21] Appl. No.: 649,215

[22] Filed: Jan. 25, 1991

Related U.S. Application Data

[63] Continuation of Ser. No. 448,756, Dec. 11, 1989, abandoned.

[30] Foreign Application Priority Data

Dec. 16, 1988 [GB] United Kingdom ............... 8829461

[51] Int. Cl.⁵ ..................... A23L 2/00; A23F 3/30; A23F 5/12
[52] U.S. Cl. ..................... 426/285; 426/591; 426/595; 426/597; 426/453; 264/126
[58] Field of Search .......... 426/285, 113, 597, 594, 426/595, 591, 516, 517, 453, 454; 264/118, 126

[56] References Cited

U.S. PATENT DOCUMENTS

| | | | |
|---|---|---|---|
| 2,372,406 | 3/1945 | Treneer | 426/594 |
| 3,471,603 | 10/1969 | Patrick | 426/285 |
| 3,520,965 | 7/1970 | Dege | 264/118 |
| 3,615,670 | 10/1971 | Sienkiewiez et al. | |
| 4,031,238 | 6/1977 | Reid | 426/285 |
| 4,232,047 | 11/1980 | Sair et al. | |
| 4,394,395 | 7/1983 | Rostagno | 426/285 |
| 4,459,315 | 7/1984 | Salo | 426/285 |
| 4,497,835 | 2/1985 | Winston | 426/285 |
| 4,594,256 | 6/1986 | Zemelman | 426/285 |
| 4,594,257 | 6/1986 | Leblanc | 426/285 |
| 4,594,258 | 6/1986 | Vitti | 426/285 |
| 4,840,809 | 6/1989 | Hsi | 426/285 |

FOREIGN PATENT DOCUMENTS

| | | |
|---|---|---|
| 2411323 | 9/1975 | Fed. Rep. of Germany . |
| 2142755 | 6/1971 | France . |
| 1043979 | 9/1966 | United Kingdom . |
| 1498119 | 12/1974 | United Kingdom . |
| 2087788 | 6/1982 | United Kingdom . |
| 2196228 | 4/1988 | United Kingdom . |

OTHER PUBLICATIONS

Grant, 1969 Hackh's Chemical Dictionary, Fourth Edition, McGraw-Hill Book Co., New York, p. 17.
McGraw-Hill Encyclopedia of Science and Technology, 1982, 5th edition, McGraw-Hill Book Co., N.Y., p. 437.

*Primary Examiner*—Carolyn Paden
*Attorney, Agent, or Firm*—Brumbaugh, Graves, Donohue & Raymond

[57] ABSTRACT

A method for forming a readily soluble or dispersable granular beverage material from a powdered extract of the beverage comprises sintering the powdered extract in a closed environment. Examples are given of coffee, tea and fruit-drink granulate preparations.

6 Claims, No Drawings

METHOD OF MAKING A GRANULAR BEVERAGE MATERIAL BY MEANS OF SINTERING AND THEN GRANULATING

This application is a continuation of application Ser. No. 07/448,756, filed on Dec. 11, 1989 which is now abandoned.

BACKGROUND OF THE INVENTION

The present invention relates to a granular beverage material and a method for its preparation from a powdered extract of the beverage.

By "beverage material" we mean any material which can be reconstituted to form a hot or cold liquid food or drink product. Such materials include tea, coffee, and drinks made from flavour extracts.

Such beverage materials are either in the form of dry powder which comprises relatively small particles (50–500 microns) or granules. One of the problems with powdered materials is that they are often hygroscopic and therefore caking can occur. In order to prevent this, anti-caking agents need to be added, which might impair taste and appearance of the ready drink and add to the costs. Furthermore, such powdered materials are often associated with large quantities of dust, by which we mean very fine material.

In British Patent GB-A- 1 498 119 (Nestlé) a method is described for the preparation of a vegetable extract, such as coffee, in the form of grains. The method comprises passing a vegetable extract, in the form of a powder or paste, through an extruder. Heat is applied to the extract during its passage through the extruder. Unfortunately, the product formed as a result of applying heat and pressure is a thermoplastic material in which the particulate structure of the vegetable extract is no longer retained. The thermoplastic product therefore requires expansion in a vacuum chamber, to give a product in the form of grains. The disadvantage with this method is the number of process steps which it involves.

It is an object of the present invention to provide a method for the preparation of a granular beverage material in which the particulate structure of the starting material is retained and which does not require an expansion step.

Thus, according to the invention there is provided a method for forming a readily soluble or dispersable granular beverage material from a powdered extract of the beverage comprising the steps of sintering the essentially dry powdered extract by heating in a closed environment to form an agglomerate thereof and then granulating the agglomerate.

DESCRIPTION OF THE PREFERRED EMBODIMENTS

By "sintering" is understood throughout this specification and the claims that the particles of the starting material are only brought in a kind of point-to-point contact in which the particles are "bridged" to one another without loosing their identity as a particle.

One advantage of the method according to the invention is that the granular beverage material retains the properties of the powdered extract of the beverage from which it is formed, but is not associated with large quantities of dust. For example, if the powdered extract of the beverage dissolved rapidly in water, the granular material will do the same. The flowability and the filling properties of the granular material will also be better than that of the powdered extract beverage material. Furthermore a granulated product is perceived by customers to be more attractive than a powdered product.

In the method according to the invention the powdered extract is heated in a closed environment. By this we mean the material is heated in a sealed container, i.e. it is not open to air. It is essential that water vapour inherent in the powdered extract is retained during the sintering step and this is why a closed environment is required. Such conditions may be achieved in a variety of ways including, for example, heating the powdered extract in a sealed container such as a sealed pouch formed from a laminate of polyester and polypropylene. Alternatively, the powdered extract may be heated inside a closed screw conveyer system. An advantage of using a closed environment is that volatile components in the powdered extract are not lost. The temperature to which the powdered extract is heated in the closed environment is preferably in the range from 80° C. to 100° C.

By "granulating" we mean the agglomerated beverage material is reduced in size to form granules with the required solubility characteristics and which preferably pass through a sieve with a size of 5 mm. Size reduction can be achieved by many methods including cutting, forcing the agglomerated beverage material through a meshed screen, or using a granulator.

The method according to the invention is applicable to a wide variety of beverage materials such as extracts of tea, including herbal tea, coffee, chicory, extracts of the foregoing materials with powdered milk and/or sugar and/or glucose, or other materials containing sugar and/or glucose, and/or powdered milk and flavour and which are intended to be reconstituted with a liquid, such as water, before consumption either as a drink or applied to a foodstuff.

The invention will now be illustrated by the following non-limiting examples.

EXAMPLES

Example 1

100 grams of a spray-dried coffee powder was placed in a sealed flexible pouch, comprising a laminate of polyester and polypropylene, and heated in a water bath, maintained at 100° C., for 5 minutes. The coffee powder formed a block in the pouch. The block was removed and reduced in size in a granulator to give coffee granules with a sieve size within the range of 2 to 4 mm.

The granules thus formed were readily dissolved in hot water to produce a hot beverage. Moreover, the coffee granules had better handling properties with respect to dosing (less blocking of the dosing equipment) and packaging (less dust) than the spray dried starting material.

Example 1A

In a comparative experiment 100 grams of the same coffee powder was placed on a plate and heated in an oven for 5 minutes at 100° C. A block of coffee powder did not form under these conditions.

This example illustrates the need to carry out the heating step in a closed environment.

By way of comparison a test was carried out using the method described in GB 1 498 119 (Nestlé) in which both heat and pressure were applied to spray dried coffee powder. In the absence of the expansion step, the coffee product formed was very hard and was not readily soluble in hot water.

Example 2

Example 1 was repeated except that a mixture of coffee powder and sugar (ratio 1 to 4) was used. The granules obtained were readily soluble in hot water.

Example 3

Example 1 was repeated except that a mixture of coffee powder and coffee whitener (ratio 1 to 2) was used. As in the Examples 1 & 2, the granules obtained were readily soluble in hot water.

Example 4

25 grams of instant Ceylon tea was placed in a sterilisable, flexible pouch, comprising a laminate of polyester and polypropylene and the pouch was subsequently sealed.

The pouch was heated for 7 minutes in a water bath at 85° C. during which a cake of sintered instant tea particles with an open structure was formed. The block was removed from the pouch and reduced in size to give tea granules with a sieve size range of from 0.5 to 2 mm.

The granules thus formed were readily dissolved in boiling water to produce an excellent tea.

Example 5

Example 4 was repeated, but, now using 35 grams of instant tea as obtained according to Example 1 of European Patent Application EP-B-0 256 567. A block was obtained, which was more dense than that which was obtained in Example 4, because the starting material was also more dense than that of Example 4. Upon granulation a product was obtained containing very little dust, which readily dissolved in boiling water to produce an excellent tea.

Example 6

50 grams of an instant fruit drink (Lipton Tropical Punch Flavour) were treated as described in Example 4 and in this case no block was obtained, but sintered agglomerate particles in a size range of 0,5-2 mm, which product readily dissolved in cold water to form a pleasant fruit drink.

This example shows that under certain conditions it is even possible to avoid the formation of a block by heating in a closed environment and thus the method is simplified in that no comminution step is required.

Example 7

Example 6 was repeated, but now using an ice tea powder (Lipton Ice Tea, ex Van den Bergh, Italy). Almost the same results as in Example 6 were obtained, the particle size being somewhat smaller. The product dissolved readily in cold water to form a very tasty ice tea.

The invention claimed is:

1. A method for forming a readily soluble or dispersable granular beverage material from a powdered extract of the beverage comprising the steps of sintering the essentially dry powdered extract by heating in a closed environment to form an agglomerate thereof and then granulating the agglomerate.

2. A method according to claim 1, in which the sintering is effected by heating in a closed environment to 80°-100° C.

3. A method according to claim 1, in which the closed environment is provided by a closed screw conveyor system.

4. A method according to claim 1, in which the granulate has an average particle size below 5 mm.

5. A method according to claim 1, in which the powdered extract of the beverage is selected from the group consisting of tea extract, coffee extract, herbal tea extract, ice tea powder, fruit drink powder, chicory extract and mixtures thereof in combination with one or more components elected from the group consisting of powdered milk, sugar, glucose, flavouring agents and colouring agents.

6. A granular agglomerate of a beverage material, obtained by the method according to claim 1.

* * * * *

UNITED STATES PATENT AND TRADEMARK OFFICE
CERTIFICATE OF CORRECTION

PATENT NO. : 5,089,279

DATED : February 18, 1992

INVENTOR(S) : Adrianus van Rooijen

It is certified that error appears in the above-identified patent and that said Letters Patent is hereby corrected as shown below:

Col. 1, line 61, "loosing" should read --losing--.

Signed and Sealed this

Eighth Day of June, 1993

Attest:

MICHAEL K. KIRK

Attesting Officer

Acting Commissioner of Patents and Trademarks